United States Patent
Schmidt et al.

(10) Patent No.: US 11,113,906 B2
(45) Date of Patent: Sep. 7, 2021

(54) PREDICTIVE MAINTENANCE AND DIAGNOSTICS USING MODULAR CONDITION MONITORING

(71) Applicant: GM Cruise Holdings LLC, San Francisco, CA (US)

(72) Inventors: Michael Frank Schmidt, Scottsdale, AZ (US); Samuel Harrison Glidden, Phoenix, AZ (US); Erik Birk Nielsen, Glendale, AZ (US); Chase Brian Kaufman, Fountain Hills, AZ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 218 days.

(21) Appl. No.: 16/215,249

(22) Filed: Dec. 10, 2018

(65) Prior Publication Data

US 2020/0184747 A1    Jun. 11, 2020

(51) Int. Cl.
*G07C 5/08* (2006.01)
*G07C 5/00* (2006.01)
*G06N 20/00* (2019.01)

(52) U.S. Cl.
CPC ........... *G07C 5/0841* (2013.01); *G07C 5/008* (2013.01); *G06N 20/00* (2019.01)

(58) Field of Classification Search
CPC ....... G07C 5/0841; G07C 5/008; G06N 20/00
See application file for complete search history.

(56) References Cited

U.S. PATENT DOCUMENTS

| | | | | |
|---|---|---|---|---|
| 5,802,545 A * | 9/1998 | Coverdill | ........... | G07C 5/10 701/33.4 |
| 7,650,210 B2 | 1/2010 | Breed | | |
| 9,373,199 B2 * | 6/2016 | Dippl | ........... | G07C 5/008 |
| 9,780,967 B2 * | 10/2017 | Sargent | ........... | G07C 5/008 |
| 9,791,861 B2 * | 10/2017 | Keohane | ........... | G05D 1/0088 |
| 9,927,813 B1 * | 3/2018 | Ferguson | ........... | G01S 7/4972 |
| 10,049,505 B1 * | 8/2018 | Harvey | ........... | G07C 5/0841 |

(Continued)

FOREIGN PATENT DOCUMENTS

DE    102015203213 A1 *  8/2015  .......... G01M 17/007

OTHER PUBLICATIONS

Shinohara et al., "Device and program for generating correction parameters for diagnostic data", English Translation from Google Patents, 2015 (Year: 2015).*

*Primary Examiner* — Yazan A Soofi
*Assistant Examiner* — Naeem Taslim Alam
(74) *Attorney, Agent, or Firm* — Medley, Behrens & Lewis, LLC (57) ABSTRACT

Predictive maintenance and diagnostics for an electronic module of an autonomous vehicle using modular condition monitoring is described herein. A computing system receives a signal from a data logger which monitors a condition of the electronic module of the autonomous vehicle, wherein the signal is indicative of damage accumulation information thereof. The computing system identifies a type of the electronic module and a damage accumulation threshold for the type of the electronic module to generate a predicted maintenance schedule for the electronic module of the autonomous vehicle. The damage accumulation information can be stored in a data store to define the damage accumulation threshold for the type of the electronic module.

20 Claims, 7 Drawing Sheets

(56) References Cited

U.S. PATENT DOCUMENTS

| | | | | |
|---|---|---|---|---|
| 2005/0174257 A1* | 8/2005 | Shankwitz | ............... | G06F 16/29 |
| | | | | 340/909 |
| 2005/0182536 A1* | 8/2005 | Doyle | ................ | G01R 31/3647 |
| | | | | 701/31.4 |
| 2012/0203408 A1* | 8/2012 | Migita | .................. | B60L 3/0061 |
| | | | | 701/22 |
| 2014/0277911 A1* | 9/2014 | Chinnadurai | .......... | G07C 5/008 |
| | | | | 701/31.4 |
| 2015/0369867 A1* | 12/2015 | Kanada | ................... | H02J 7/007 |
| | | | | 324/432 |
| 2016/0241699 A1* | 8/2016 | Milnark | ................... | H04W 4/48 |
| 2017/0278312 A1* | 9/2017 | Minster | ................... | G06Q 10/00 |
| 2018/0001744 A1* | 1/2018 | Vehr | ................... | B60H 1/00428 |
| 2018/0284807 A1* | 10/2018 | Wood | ..................... | B60L 53/80 |
| 2020/0001736 A1* | 1/2020 | Imai | ........................ | B60L 53/66 |

\* cited by examiner

PREDICTIVE MAINTENANCE AND DIAGNOSTICS USING MODULAR CONDITION MONITORING

BACKGROUND

An autonomous vehicle is a motorized vehicle that can operate without a human driver. An exemplary autonomous vehicle includes a plurality of sensor systems such as, but not limited to, a camera sensor system, a lidar sensor system, a radar sensor system, amongst others, wherein the autonomous vehicle is controlled based upon sensor signals output by the sensor systems. The sensor systems as well as mechanical systems (e.g., a vehicle propulsion system, a braking system, or a steering system) and other systems of the autonomous vehicle are controlled according to signals generated by one or more electronic modules. The electronic modules may be in communication with an internal computing system that controls operations of the autonomous vehicle.

Several types of electronic modules incorporated in autonomous vehicles have been validated, for example, only up to 12,000 hours of operation (i.e., approximately 1.37 years). Given that some electronic modules can be active while the autonomous vehicle is parked or charging, certain electronic modules are expected to exceed their validated operating threshold during the life of the autonomous vehicle. An exemplary autonomous vehicle may have a useful life of 4 or more years of operating time. Accordingly, it can be cost prohibitive to replace an electronic module after every 12,000 hours of operation when the actual damage accumulation to the electronic module does not otherwise indicate that the electronic module is going to fail.

Validation of electronic modules for longer operating thresholds is problematic because the validation process may involve inexact assumptions regarding conditions, such as temperature cycle profiles or duty cycles, to which the electronic modules might be exposed. To validate the electronic modules otherwise, based upon empirical confidence, could require collecting data from hundreds of vehicles each operating for hundreds of thousands of miles. Further, due to the low probability of detecting a critical event during operation of the electronic module, such testing procedures are not usually practical. Thus, while the validation process provides sufficient confidence that the electronic module will have a safe operating life up to its validated threshold, conservative assumptions (e.g., anticipated exposure to certain temperature cycles) may inaccurately reflect the actual damage accumulation that a particular electronic module has experienced.

SUMMARY

The following is a brief summary of subject matter that is described in greater detail herein. This summary is not intended to be limiting as to the scope of the claims.

Described herein are various technologies pertaining to predictive maintenance and diagnostics for an electronic module of an autonomous vehicle using modular condition monitoring. With more specificity, described herein is a computing system that receives damage accumulation information for the electronic module of the autonomous vehicle to determine whether the electronic module has exceeded its damage accumulation threshold. The damage accumulation threshold is an indicator of condition degradation to the electronic module that prompts desirable servicing to the electronic module. The damage accumulation information, which may define the damage accumulation threshold, can include for example, the amount of time that an electronic module has been exposed to an environmental or other condition such as temperature, humidity, vibration, voltage, or current.

With still more specificity, described herein is a computing system that receives a signal from a data logger, which provides damage accumulation information for an electronic module of the autonomous vehicle. The data logger and the electronic module are included in the autonomous vehicle. The computing system identifies a type of the electronic module and a damage accumulation threshold for the type of the electronic module to generate a predicted maintenance schedule, such as a replacement or servicing schedule for the electronic module. The computing system includes a data store comprising damage accumulation information for the type of electronic module, which may be included in one or more autonomous vehicles. The damage accumulation threshold can be modified according to a damage accumulation model as additional damage accumulation information for more electronic modules of the type is received and stored in the data store. The damage accumulation model can be generated based upon training data (e.g., damage accumulation information) received from one or more data loggers and can specify damage accumulation thresholds for differing types of electronic modules.

In an example, an autonomous vehicle incorporating one or more electronic modules may arrive at a service garage for periodic inspections (e.g., on a monthly basis). The autonomous vehicle may be part of a fleet of autonomous vehicles scheduled for routine servicing, wherein each vehicle in the fleet of autonomous vehicles stores damage accumulation information pertaining to electronic modules incorporated therein. During certain inspections, such as every third inspection, damage accumulation to the one or more electronic modules is determined from data loggers additionally incorporated in the autonomous vehicle. The data loggers are configured to monitor the condition of an electronic module. For instance, a data logger can be included as part of, attached to, or positioned in close proximity to an electronic module. Accordingly, the data logger may output a signal indicative of damage accumulation by retrofitting the data logger to the electronic module or by incorporating a data logger internal to the electronic module during production.

An exemplary data logger is configured as a battery powered device that monitors at least one of temperature, humidity, vibration, voltage, or current. However, condition monitoring sensors could likewise be wired to the autonomous vehicle to provide similar functionality. The data logger can further be housed in a robust case that is mountable to the autonomous vehicle in a plurality of locations. A scanning device can be used to scan the data logger, possibly through physical contact thereof, for stored data such as vehicle information (e.g., type, year, operating times, included sensors/electronics, and other vehicle parts), electronic module information (e.g., damage accumulation, type of electronic module, monitored conditions, etc.), and/or previous vehicle inspection dates, which can be linked to vehicle maintenance history, to predict maintenance schedules for the autonomous vehicle and included electronic modules.

The scanned data from the data logger is incorporated in a signal provided to a computing system, which may be configured as a remote computing system to the autonomous vehicle. A maintenance schedule for the electronic module is predicted based upon damage accumulation information specified by data included in the signal, the type of electronic module, and the damage accumulation threshold for the type of electronic module. A maintenance recommendation is then outputted by the computing system based upon the prediction. The signal from the data logger may identify the type of electronic module that the data logger monitors so that the computing system can differentiate the type of electronic module from a plurality of electronic module types stored in memory. The electronic modules include, but are not limited to, safety critical electronic modules such as those that sense the environment, detect power failures, perform mapping, localization, and planning, modules that control mechanically based systems such as propulsion, steering, braking, stability, and shifting, as well as modules that include copilots, remote assistance, and other safety systems.

A processor of the computing system processes damage accumulation information received from the data logger to optimize maintenance and mitigate unexpected failures, for example, by generating a replacement schedule that is based upon the type of electronic modules monitored by the data logger. The computing system maintains a damage accumulation model that continually updates part replacement recommendations based upon statistical analysis of collected data (e.g., from autonomous vehicle fleet data). Thus, the damage accumulation threshold for a particular type of electronic module is defined according to damage accumulation information from other electronic modules of the type, which includes other electronic modules of the type in a same autonomous vehicle as well as other electronic modules of the type in other autonomous vehicles (e.g., electronic modules of other autonomous vehicles that are under a same load or exposed to the same or similar environmental conditions). Nevertheless, the damage accumulation threshold can be modified from time-to-time by the computing system based upon additional damage accumulation information received from one or more data loggers.

Additionally, damage accumulation information from a retrofitted data logger may need to be normalized by the computing system according to a retrofit calibration that is based upon previously collected damage accumulation information stored in the data store from other autonomous vehicles. That is, when a data logger is physically affixed to an electronic module, the generated signal could include inaccuracies (e.g., regarding temperature measurements) due to slight variations in placement locations of the data logger on or near the electronic module. Accordingly, the computing system is configured to use information stored in the data store, such as fleet data collected from a fleet of autonomous vehicles, to calibrate an incoming signal from the data logger. The fleet data includes, but is not limited to, geographic location of the vehicle, vehicle speed and load, and local weather conditions at the time of a reading. The computing system may perform the calibration process based upon the Law of Large Numbers by comparing the data logger output to a plurality of outputs from data loggers operating under the same conditions. Condition monitoring that includes such calibrations by the computing system provides improved confidence that the electronic modules of an autonomous vehicle and, of particular importance, the safety critical modules are not going to exceed their anticipated damage accumulation threshold.

The computing system that processes the damage accumulation signal from the data logger may be incorporated in the autonomous vehicle. For example, the data logger may include a low energy Bluetooth transceiver configured to transmit signals to a communication system included in an internal computing system of the autonomous vehicle. The damage accumulation threshold for the type of the electronic module may then be provided to the computing system from a remote server to determine whether an electronic module is approaching or has surpassed its damage accumulation threshold. The communication system can send an alert to maintenance personnel regarding the condition of an electronic module and/or execute instructions to navigate the autonomous vehicle to a service garage. Alternatively, the communication system can transmit the signal received via Bluetooth to a receiver of the computing system to determine whether an electronic module is approaching or has surpassed its damage accumulation threshold.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to predictive maintenance and diagnostics for an electronic module of an autonomous vehicle using modular condition monitoring is now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "component", "module", and "system" are intended to encompass computer-readable data storage that is configured with computer-executable instructions that cause certain functionality to be performed when executed by a processor. The computer-executable instructions may include a routine, a function, or the like. It is also to be understood that a component, module, or system may be localized on a single device or distributed across several devices.

Further, as used herein, the term "exemplary" is intended to mean serving as an illustration or example of something and is not intended to indicate a preference.

Figure 1:
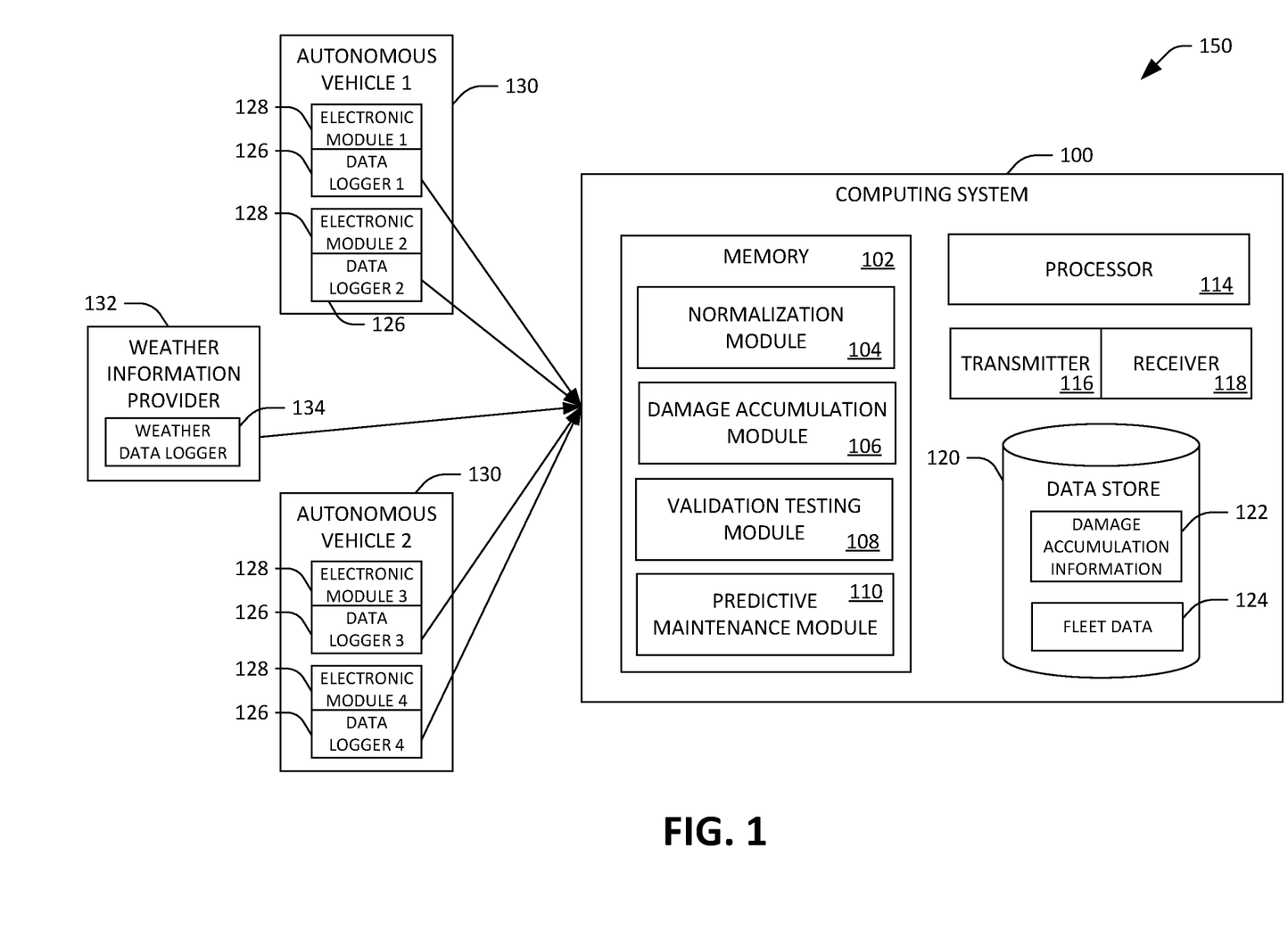
FIG. 1 illustrates an exemplary computing system configured to receive one or more signals indicative of damage accumulation to one or more electronic modules included in one or more autonomous vehicles.

With reference now to FIG. 1, illustrated is an exemplary environment 150 that includes a computing system 100, a plurality of autonomous vehicles, and a weather information provider 132. The computing system 100 is configured to receive a signal from one or more data loggers 126 indicative of damage accumulation to one or more electronic modules 128 included in one or more autonomous vehicles 130. The computing system 100 is likewise configured to receive a signal from the weather information provider 132, which may be a third party computing system that monitors, stores, and predicts trends for current, historical, and future weather conditions. The signal from the weather information provider 132 can be similarly indicative of damage accumulation to the one or more electronic modules 128 included in the one or more autonomous vehicles 130. For example, the weather data logger 134 may accumulate information from instruments such as thermometers or hygrometers that monitor environmental conditions for a specified geographic area, wherein the information is provided to the computing system 100 as a basis for determining damage accumulation to the one or more electronic modules 128 included in the one or more autonomous vehicles 130.

A transmitter 116 and a receiver 118, which may be configured as a single transceiver, is disposed in the exemplary computing system 100 to establish communication with the one or more autonomous vehicles 130; however, according to other embodiments, it is contemplated that the transmitter 116 and the receiver 118 can additionally or alternatively communicate with a device that interrogates the data loggers 126 of the autonomous vehicles. The computing system 100 comprises a processor 114 and memory 102 that stores computer-executable instructions that are executed by the processor 114 to cause the processor 114 to perform acts in accordance therewith. The memory 102 can include a plurality of modules 104-110 that cooperate to generate a predicted maintenance schedule for the one or more electronic modules 128.

A signal provided to the computing system 100 from the one or more data loggers 126 specifies data that includes damage accumulation information 122, which is stored in a data store 120. A normalization module 104 may be executed by the processor 114 to normalize inconsistencies in the damage accumulation information 122 received from the one or more data loggers 126. For instance, retrofitting the one or more data loggers 126 to the one or more electronic modules 128 may result in slight variations in placement locations that cause inconsistencies in generated signals. Thus, the sensor normalization module 104 is configured to calibrate the damage accumulation information 122 based upon stored damage accumulation information from fleet data 124 that is additionally included in the data store 120. The fleet data 124 identified for retrofit calibrations may be collected from other autonomous vehicles under known testing conditions such as geographic location of the vehicle, vehicle speed and load, local weather conditions at the time of a reading, etc. Calibration can be performed by comparing the damage accumulation information 122 captured in the signal from the one or more data loggers 126 with the fleet data 124.

A damage accumulation module 106 defines a damage accumulation threshold for the one or more electronic modules 128 based upon a statistical model, wherein the damage accumulation threshold is an indicator of condition degradation to the one or more electronic modules 128 that prompts servicing thereto. The statistical model generates an output based upon an analysis of damage accumulation thresholds identified in the fleet data 124 for a type of the electronic module. Thus, the damage accumulation threshold for a particular type of electronic module can be defined according to damage accumulation information from other electronic modules of the type, which includes other electronic modules of the type in a same autonomous vehicle as well as other electronic modules of the type in other autonomous vehicles (e.g., electronic modules of other autonomous vehicles that are under a same load or exposed to the same or similar environmental conditions). The damage accumulation threshold for the type of the electronic module can be modified by the statistical model as more fleet data 124 is provided to the data store 120. In an example, the damage accumulation information 122 may be stored as additional fleet data 124 in the data store 120.

Outputs that include the normalized damage accumulation information and the damage accumulation threshold are provided to a validation testing module 108 from the normalization module 104 and the damage accumulation module 106, respectively. The validation testing module 108 is executed to identify from the normalized damage accumulation information whether the damage accumulation to the one or more electronic modules 128 exceeds the damage accumulation threshold. The output of the validation testing module 108 is provided to a predictive maintenance module 110 to generate a predicted maintenance schedule based upon whether the damage accumulation threshold is exceeded and/or whether condition degradation to the one or more electronic modules 128 is approaching the damage accumulation threshold. The predicted maintenance schedule can include recommendations for servicing and replacement of the one or more electronic modules 128 included in the one or more autonomous vehicles 130.

Figure 2:
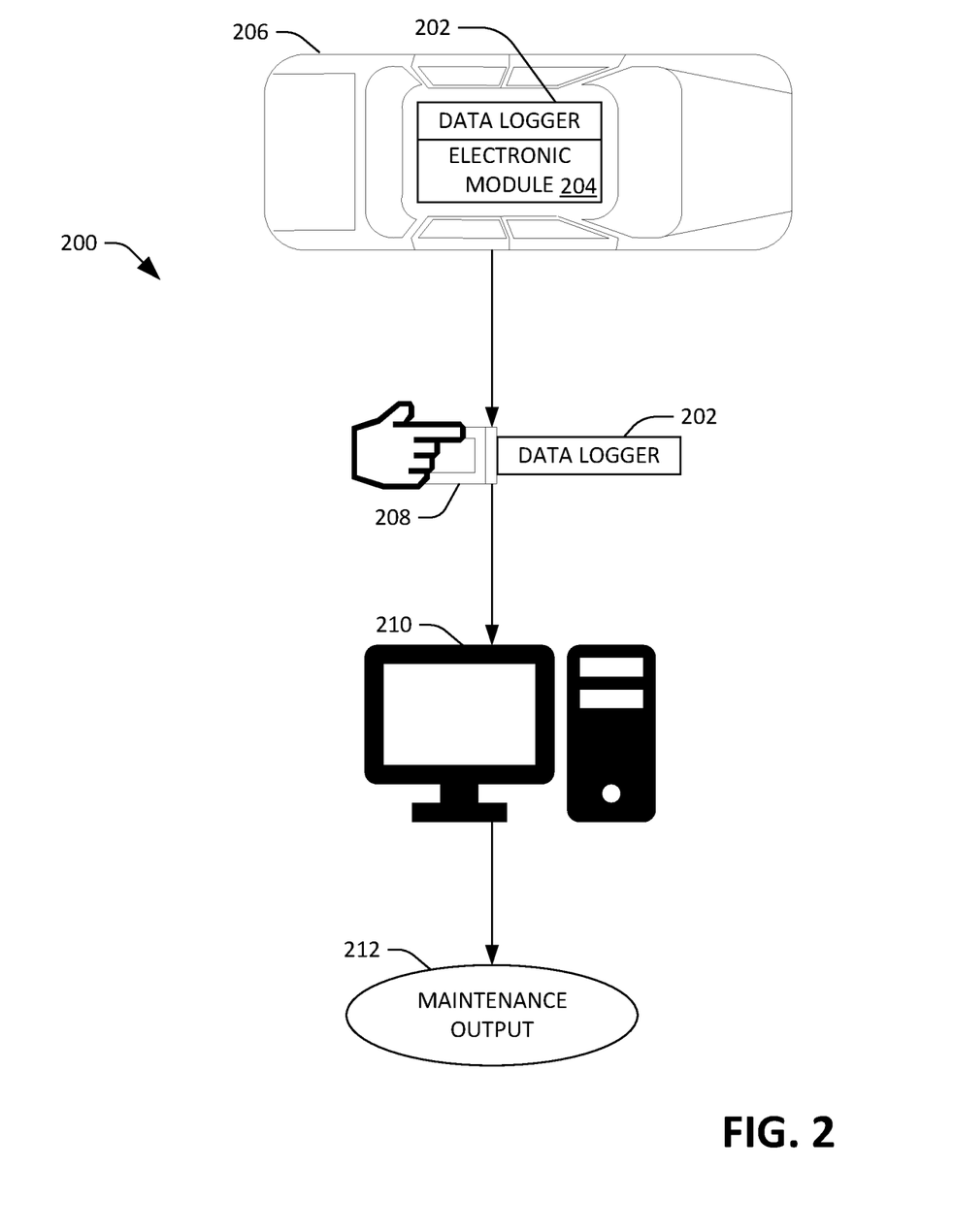
FIG. 2 is a flow diagram illustrating a process for performing predictive maintenance and diagnostics for an electronic module of an autonomous vehicle.

With reference now to FIG. 2, flow diagram 200 illustrates a process for performing predictive maintenance and diagnostics for an electronic module 204 of an autonomous vehicle 206. In an example, an autonomous vehicle 206 may require periodic inspections to confirm that the autonomous vehicle 206 and electronic modules thereof are in a desirable condition for continued operation. A data logger 202 can be used to monitor damage accumulation to the electronic module 204 based upon conditions such as temperature cycles or duty cycles, wherein data is stored by the data logger 202 and accessed during the periodic inspections. The data logger 202 may be a battery powered device that is retrofitted to, or disposed in proximity of, the electronic module 204. The data logger 202 can be removed from the autonomous vehicle 206 or accessed in-place to retrieve damage accumulation information stored thereon.

A scanning device 208 scans the data logger 202 for information including, but not limited to, vehicle information, electronic module information, and prior vehicle/electronic module maintenance history. The scanning device 208 may be a device that retrieves the information by communicating with the data logger 202 through physical contact. However, the scanning device 208 can also be a device that communicates with the data logger 202 through non-physical contact, such as radio-frequency identification (RFID), wireless signals, and other similar techniques. The scanning device 208 is typically a handheld device but can also be embodied in larger devices and equipment. A signal incorporating retrieved information from the data logger 202 is provided to the scanning device 208 via a first transfer of data, wherein the scanning device 208 further provides the signal to a computing system 210 via a second transfer of data. The second transfer of data from the scanning device 208 to the computing system 210 may be performed by a same or similar transfer technique as used for the first transfer of data from the data logger 202 to the scanning device 208.

The computing system 210 can be a system that is remotely disposed to the autonomous vehicle 206 for predicting maintenance schedules, remaining electronic module life, recommend service/replacement, etc. based upon the damage accumulation information signal provided by the scanning device 208, which was likewise provide from the data logger 202. The signal from the data logger 202 may identify a type of electronic module from a plurality of electronic module types stored in memory of the computing system 210 and may further indicate whether the electronic module 204 is a safety critical module. The computing system 210 processes the damage accumulation signal according to a damage accumulation model to define a damage accumulation threshold for the type of electronic module 204 monitored by the data logger 202.

A maintenance output 212 (e.g., a prediction or a recommendation) is generated by the computing system 210 based upon the damage accumulation model to improve upon conventional electronic module maintenance and replacement schedules. The maintenance output 212 from the damage accumulation model can include predicting the expected remaining life of an electronic module 204 based upon identified damage accumulation thereto and comparing the damage accumulation to stored failure data for other similar electronic modules of the type. In certain instances, the computing system 210 may calibrate the damage accumulation information incorporated in the signal from the data logger 202 to further reduce errors and provide improved confidence in the generated maintenance output 212.

Figure 3:
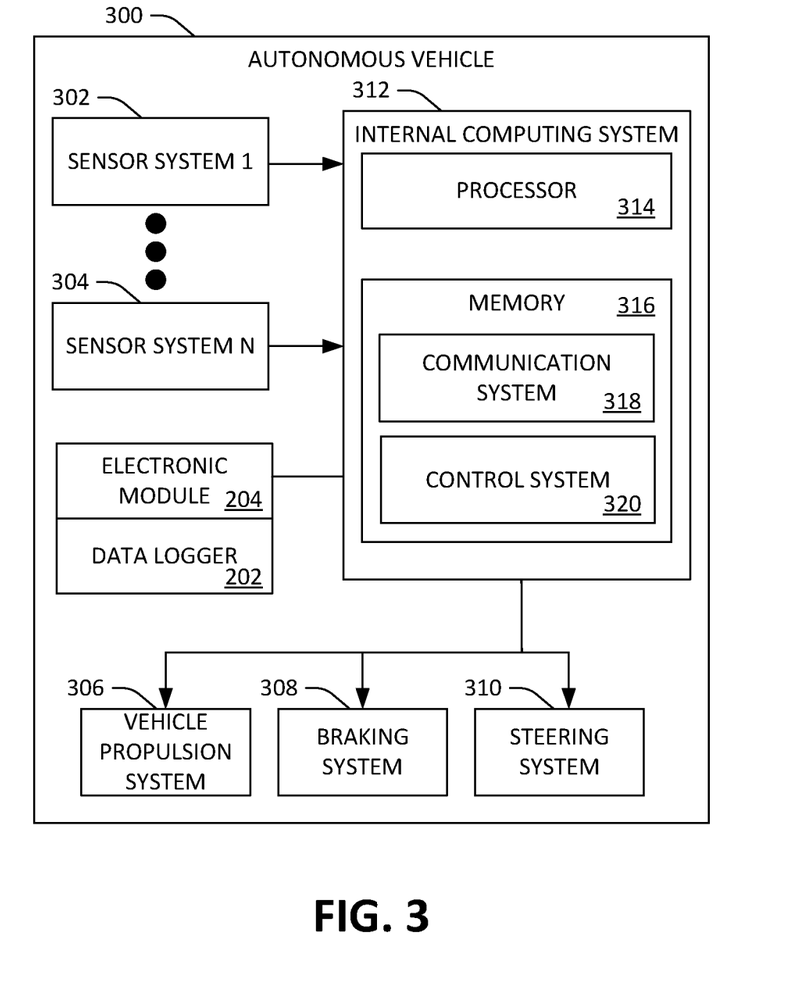
FIG. 3 illustrates an exemplary autonomous vehicle.

With reference now to FIG. 3, an exemplary autonomous vehicle 300 is illustrated. The autonomous vehicle 300 can navigate about roadways without a human driver based upon sensor signals output by sensor systems 302-304 of the autonomous vehicle 300. The autonomous vehicle 300 includes a plurality of sensor systems 302-304 (a first sensor system 302 through an Nth sensor system 304). The sensor systems 302-304 are of different types and are arranged about the autonomous vehicle 300. For example, the first sensor system 302 may be a camera sensor system and the Nth sensor system 304 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 300 further includes several mechanical systems that are used to effectuate appropriate motion of the autonomous vehicle 300. For instance, the mechanical systems can include but are not limited to, a vehicle propulsion system 306, a braking system 308, and a steering system 310. The vehicle propulsion system 306 may include an electric motor, an internal combustion engine, or both. The braking system 308 can include an engine break, brake pads, actuators, and/or any other suitable componentry that is configured to assist in decelerating the autonomous vehicle 300. The steering system 310 includes suitable componentry that is configured to control the direction of movement of the autonomous vehicle 300 during propulsion.

The autonomous vehicle 300 additionally comprises an internal computing system 312 that is in communication with the sensor systems 302-304, the mechanical systems 306-310, and an electronic module 204. The internal computing system 312 includes a processor 314 and memory 316 having computer-executable instructions that are executed by the processor 314. Memory 316 further comprises a communication system 318 and a control system 320. The control system 320 is configured to control operation of the vehicle propulsion system 306, the braking system 308, and/or the steering system 310. The control system 320 receives sensor signals from the sensor systems 302-304 as well as outputs from individual modules incorporated in memory 316. The communication system 318 may be configured as an independent module of memory 316 or included in the autonomous vehicle 300 as a separate system that transmits and receives signals from/to other systems and devices.

The electronic module 204 is likewise included in the autonomous vehicle 300. The electronic module 204 may be or control the sensor systems 302-304. Further, the electronic module 204 may be controlled by the internal computing system 312. For example, the control system 320 may be in communication with the electronic module 204 to control operations thereof. The electronic module 204 can include, but is not limited to, safety critical electronic modules such as environment sensors, power failure detectors, mechanical system controllers, mappers, localizers, planners, copilots, remote assistants, amongst others.

A data logger 202 monitors and stores damage accumulation caused by environmental or other conditions such as temperature, humidity, vibration, voltage and/or current. The data logger 202 may be affixed to the electronic module 204, incorporated within the electronic module 204, or disposed in proximity to the electronic module 204. The autonomous vehicle 300 can also include a plurality of data loggers 202 that monitor a plurality of electronic modules 204. Moreover, a single electronic module 204 may be monitored by a plurality of data loggers 202, for example, a first data logger that monitors temperature and a second data logger that monitors vibration. A plurality of electronic modules 204 can likewise be monitored by a single data logger 202, such as a data logger that monitors the humidity of the environment.

Figure 4:
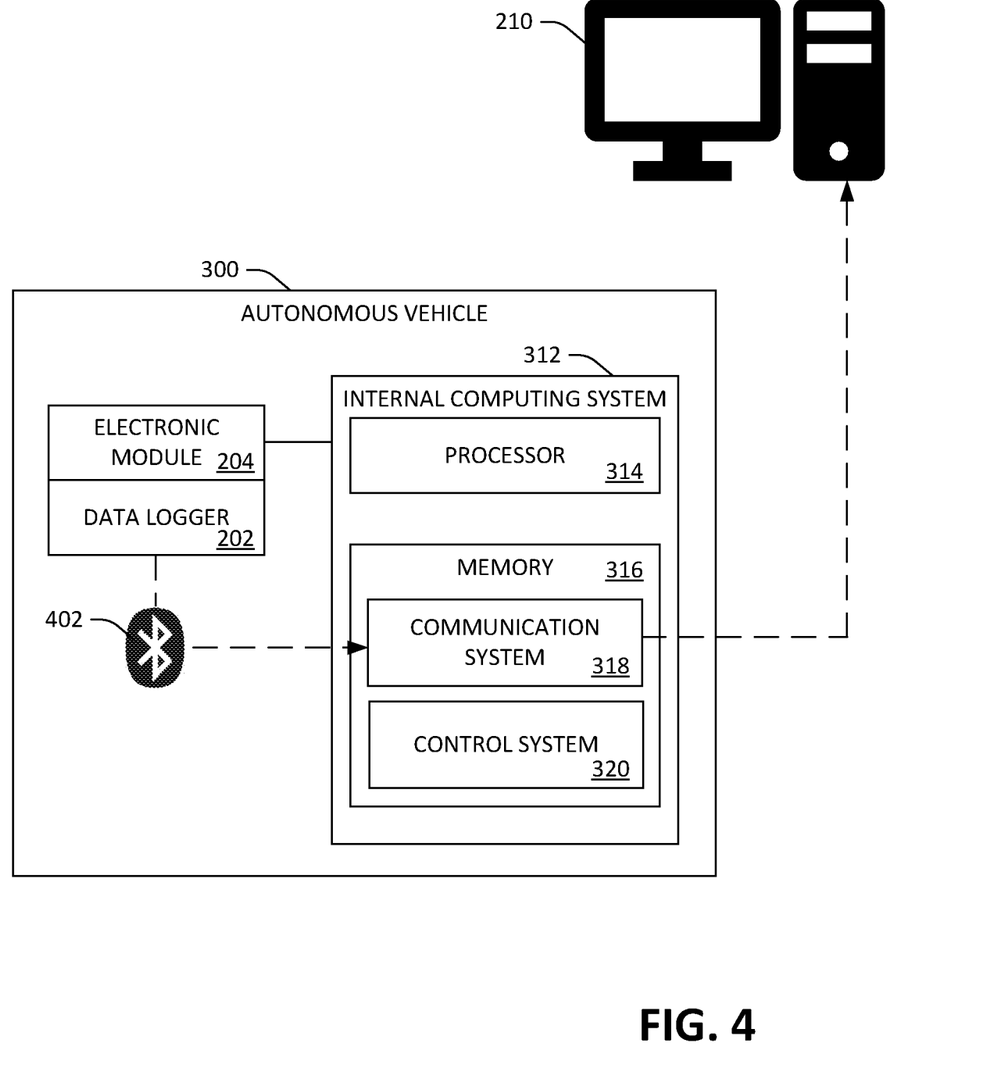
FIG. 4 illustrates a data logger that communicates with an internal computing system of the autonomous vehicle by a Bluetooth transmission signal.

With reference now to FIG. 4, the autonomous vehicle 300 provides damage accumulation information from the data logger 202 to a computing system 210 without an intermediate scanning device 208 that transfers the information. In particular, the data logger 202 generates a low energy Bluetooth signal 402 that is provided to a receiver of the internal computing system 312 incorporated in the autonomous vehicle 300. Information captured in the Bluetooth signal 402 is provided to the communication system 318 where a transmitter that is, for example, configured to establish personal LTE communication, transmits the information to the computing system 210 to identify damage accumulation to the electronic module 204 and generate a predictive maintenance schedule and/or replacement recommendation.

Communication of the damage accumulation information to the internal computing system 312 may occur without human intervention via a continuously transmitted Bluetooth signal 402 from the data logger 202 as well as by Bluetooth signals 402 transmitted to the internal computing system 312 at periodic intervals. The internal computing system 312 is configured to receive the damage accumulation threshold for the electronic module 204 from the computing system 210 to locally generate the predicted maintenance schedule, for example, on in-vehicle display. The communication system 318 may likewise transmit notifications to the computing system 210 or other similar device, wherein maintenance personnel may be provided with information regarding the condition of the electronic module 204. The control system 320 can then execute instructions to navigate the autonomous vehicle 300 to a service garage where maintenance issues and recommendations can be addressed.

Figure 5:
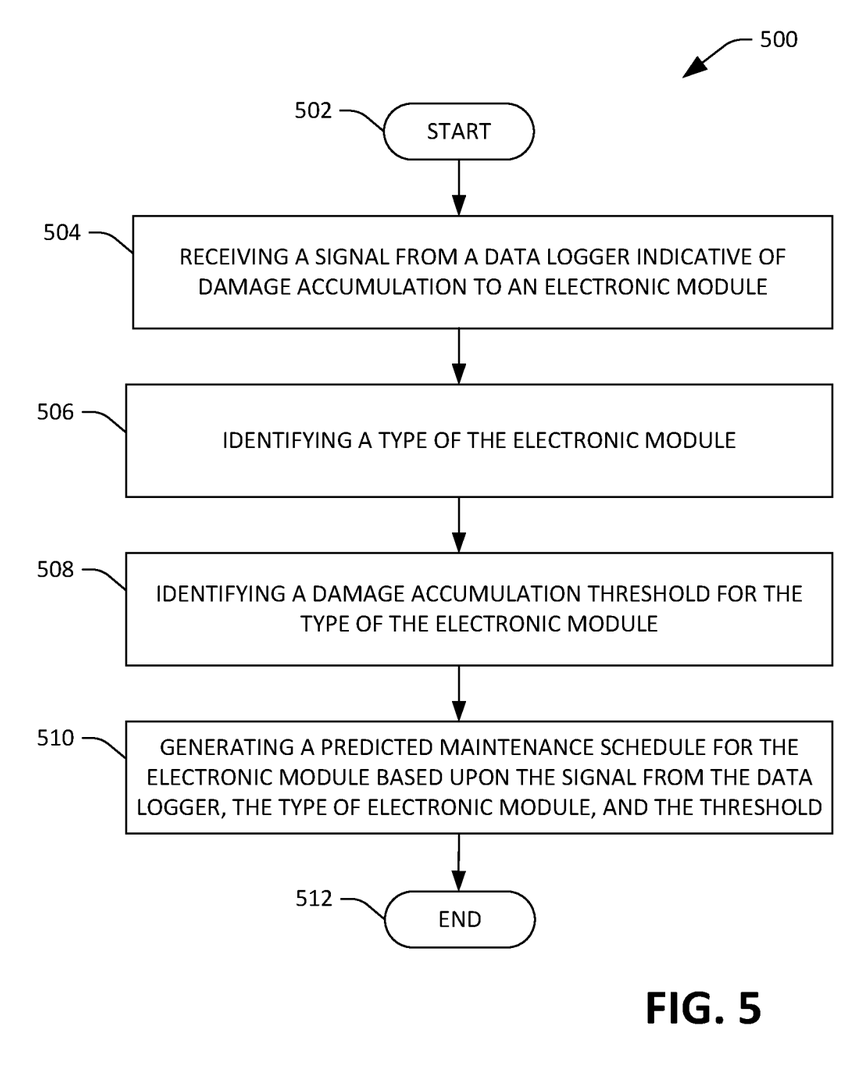
FIG. 5 is a flow diagram illustrating an exemplary methodology for generating a predicted maintenance schedule for an electronic module of an autonomous vehicle.
Figure 6:
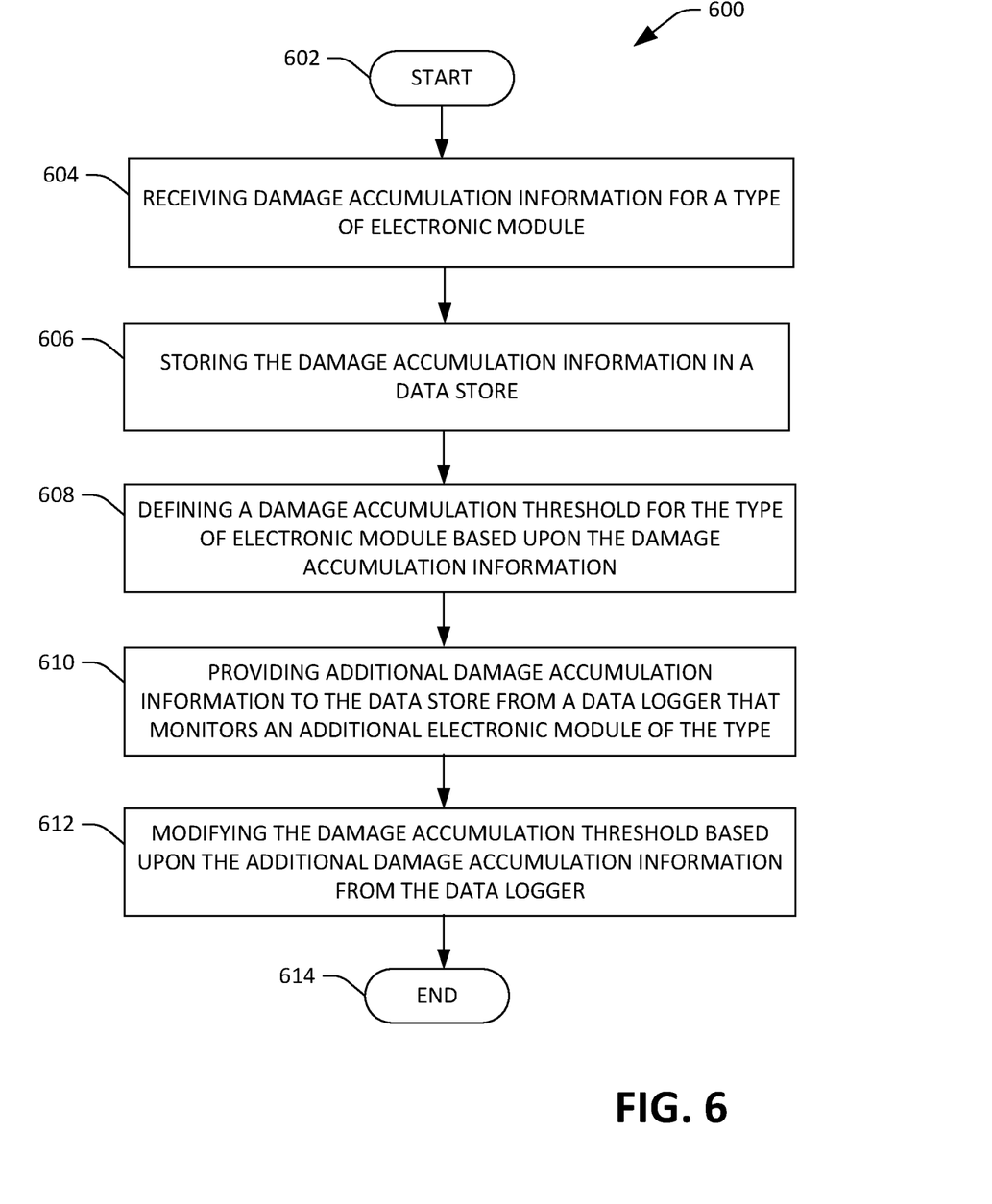
FIG. 6 is a flow diagram illustrating an exemplary methodology for defining a damage accumulation threshold based upon stored training data.

FIGS. 5 and 6 illustrate exemplary methodologies relating to predictive maintenance and diagnostics for an electronic module of an autonomous vehicle using modular condition monitoring. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 for generating a predicted maintenance schedule for an electronic module of an autonomous vehicle is illustrated. The methodology 500 starts at 502, and at 504 a signal from a data logger indicative of damage accumulation to an electronic module is received by a computing system, wherein the data logger and the electronic module are included in an autonomous vehicle. Damage accumulation can result from environmental or other conditions that include, but are not limited to, temperature, humidity, vibration, voltage, and current. At 506, the computing system identifies a type of the electronic module. The type of electronic module may be identified from the signal based upon a plurality of electronic modules stored in memory. At 508, the computing system identifies a damage accumulation threshold for the type of the electronic module. For example, different types of electronic modules may have different damage accumulation thresholds. At 510, a predicted maintenance schedule for the electronic module is generated based upon the damage accumulation signal from the data logger, the type of the electronic module, and the damage accumulation threshold. Maintenance predictions can include replacement of the electronic module, servicing requirements or recommendations, generation of suggested replacement schedules (e.g., based upon a predicted remaining life of the electronic module), amongst others. The methodology 500 completes at 512.

Referring now to FIG. 6, an exemplary methodology 600 for defining a damage accumulation threshold based upon stored training data is illustrated. The methodology 600 starts at 602, and at 604 damage accumulation information for a type of electronic module is received by a computing system. At 606, the damage accumulation information is stored in a data store. That data store is configured to store data from the electronic modules of the type as well as data provided from a plurality of other types of electronic modules. At 608, a damage accumulation threshold for the type of electronic module is defined based upon the damage accumulation information. For example, a computing system may use the information stored in the data store to perform a statistical analysis that outputs a safe operating threshold for damage accumulation to a specific type of electronic module. At 610, additional damage accumulation information is provided to the data store from a data logger that monitors an additional electronic module of the type. In particular, the data store is configured to receive damage accumulation information from additional autonomous vehicles, which include additional electronic modules of the type and the plurality of types, to accumulate a larger dataset from which to define the damage accumulation threshold. At 612, the damage accumulation threshold is modified according to the additional damage accumulation information provided from the data logger. That is, data included in the additional damage accumulation information can impact the statistical analysis performed by the damage accumulation model to define/output a modified damage accumulation threshold. The methodology 600 completes at 614.

Figure 7:
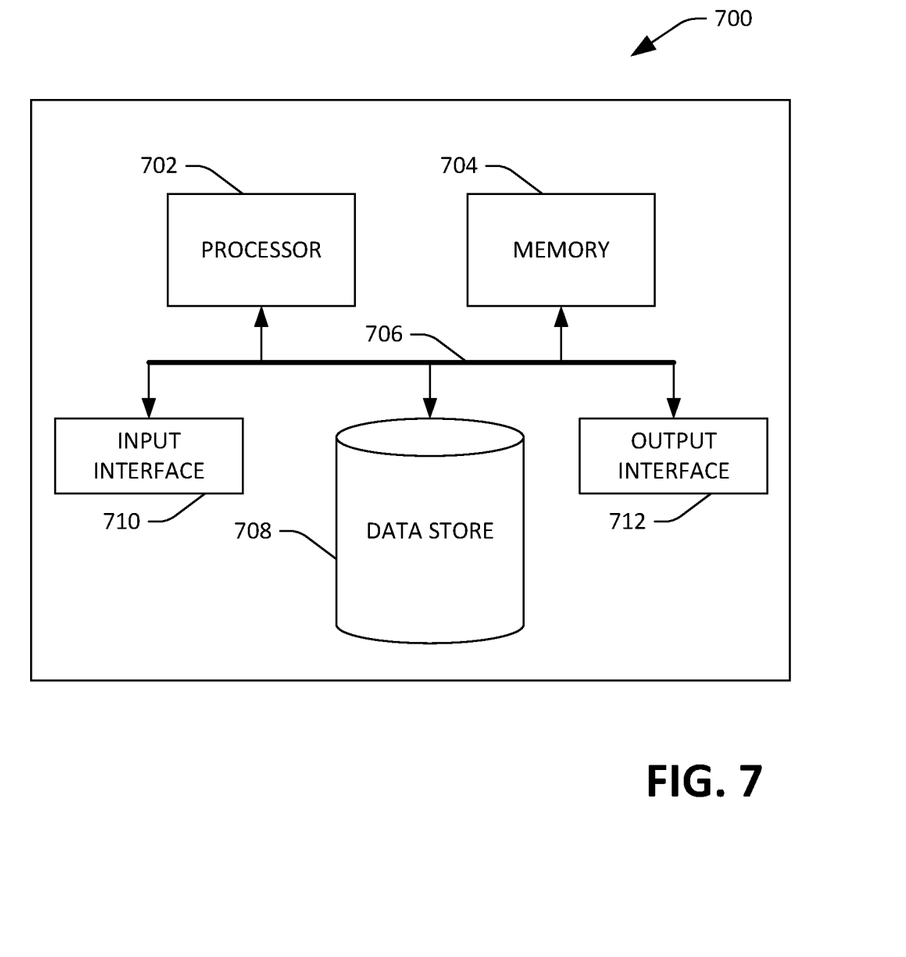
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be or include the computing system 100. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. In addition to storing executable instructions, the memory 704 may also store location information, distance information, direction information, etc.

The computing device 700 additionally includes a data store 708 that is accessible by the processor 702 by way of the system bus 706. The data store 708 may include executable instructions, location information, distance information, direction information, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the vehicle propulsion system 306, the braking system 308, and/or the steering system 310 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system, comprising:
   a processor; and
   one or more memory devices that store instructions that, when executed by the processor, cause the processor to perform acts comprising:
   receiving damage accumulation information from a data logger of an autonomous vehicle, the damage accumulation information being indicative of damage accumulation to an electronic module of the autonomous vehicle, the data logger being configured to monitor the electronic module, the damage accumulation information comprising information specifying an amount of time that the electronic module has been exposed to one or more environmental conditions;
   identifying a type of the electronic module;
   identifying a damage accumulation threshold for the type of the electronic module, wherein the damage accumulation threshold for the type of the electronic module is based on fleet-wide damage accumulation information for the type of the electronic module from a plurality of autonomous vehicles in a fleet, wherein the fleet-wide damage accumulation information for the type of the electronic module comprises at least logged vibrations to which electronic modules of the plurality of autonomous vehicles in the fleet have been exposed over time, wherein the damage accumulation threshold for the type of the electronic module is modified over time as additional fleet-wide damage accumulation information for the type of the electronic module is received;
   generating a predicted maintenance schedule for the electronic module of the autonomous vehicle based upon the damage accumulation information from the data logger, the type of the electronic module, and the damage accumulation threshold for the type of the electronic module; and
   outputting the predicted maintenance schedule for the electronic module from the computing system.

2. The computing system of claim 1, wherein the damage accumulation information from the data logger includes data specifying the type of the electronic module; and
   wherein the type of the electronic module is identified from a plurality of electronic module types.

3. The computing system of claim 1, wherein the damage accumulation information from the data logger is received from a scanning device that scans the data logger for the damage accumulation information.

4. The computing system of claim 1, wherein the predicted maintenance schedule for the electronic module is further generated based upon at least one of vehicle information, electronic module information, or vehicle maintenance history.

5. The computing system of claim 1, wherein the data logger is retrofitted to the electronic module to detect the damage accumulation to the electronic module.

6. The computing system of claim 1, wherein the one or more environmental conditions to which the electronic module has been exposed and that are monitored by the data logger comprise at least one of temperature, humidity, vibration, voltage, or current.

7. The computing system of claim 1, wherein the data logger is a battery powered device.

8. The computing system of claim 1, wherein generating the predicted maintenance schedule for the electronic module includes generating a replacement schedule for the electronic module.

9. The computing system of claim 1, further comprising:
   a receiver, wherein the receiver receives the damage accumulation information from a communication system incorporated into the autonomous vehicle, and wherein the communication system incorporated into the autonomous vehicle receives the damage accumulation information from the data logger.

10. The computing system of claim 1, wherein the computing system is included in the autonomous vehicle; and
wherein the damage accumulation threshold for the type of the electronic module is received by the computing system from a remote server.

11. A computing system, comprising:
a data storage device, the data storage device comprising damage accumulation information for a type of electronic module included in one or more autonomous vehicles;
a processor; and
one or more memory devices that store instructions that, when executed by the processor, cause the processor to perform acts comprising:
defining a damage accumulation threshold for the type of electronic module based upon the damage accumulation information in the data storage device, wherein the damage accumulation threshold is an indicator of condition degradation that prompts servicing to the type of electronic module, wherein the damage accumulation information comprises at least logged vibrations to which electronic modules of the one or more autonomous vehicles have been exposed over time;
receiving additional damage accumulation information from a data logger of a particular autonomous vehicle, the additional damage accumulation information being indicative of particular damage accumulation to a particular electronic module of the particular autonomous vehicle, the data logger being configured to monitor the particular damage accumulation to the particular electronic module of the particular autonomous vehicle; and
modifying the damage accumulation threshold for the type of electronic module based upon the additional damage accumulation information from the data logger of the particular autonomous vehicle.

12. The computing system of claim 11, wherein the damage accumulation information for the type of electronic module is accumulated from a fleet of autonomous vehicles including the type of electronic module.

13. The computing system of claim 11, wherein the additional damage accumulation information from the data logger is normalized by a retrofit calibration that is based upon the damage accumulation information included in the data storage device.

14. A computing system, comprising:
a computer-readable storage medium that comprises instructions that, when executed by one or more processors, cause the one or more processors to perform acts comprising:
receiving damage accumulation information from a data logger of an autonomous vehicle, the damage accumulation information being indicative of damage accumulation to an electronic module, the data logger being configured to monitor the electronic module, the data logger being at least one of attached to or included as part of the electronic module, the damage accumulation information comprising information specifying an amount of time that the electronic module has been exposed to one or more environmental conditions;
identifying a type of the electronic module;
identifying a damage accumulation threshold for the type of the electronic module, wherein the damage accumulation threshold for the type of the electronic module is based on fleet-wide damage accumulation information for the type of the electronic module from a plurality of autonomous vehicles in a fleet, wherein the fleet-wide damage accumulation information for the type of the electronic module comprises at least logged vibrations to which electronic modules of the plurality of autonomous vehicles in the fleet have been exposed over time, wherein the damage accumulation threshold for the type of the electronic module is modified over time as additional fleet-wide damage accumulation information for the type of the electronic module is received;
generating a predicted maintenance schedule for the electronic module of the autonomous vehicle based upon the damage accumulation information from the data logger, the type of the electronic module, and the damage accumulation threshold for the type of the electronic module; and
outputting the predicted maintenance schedule for the electronic module from the computing system.

15. The computing system of claim 1, wherein the electronic module comprises one of a power failure detector of the autonomous vehicle, a sensor of the autonomous vehicle, or a mechanical system controller of the autonomous vehicle.

16. The computing system of claim 1, wherein the data logger is at least one of attached to or included as part of the electronic module.

17. The computing system of claim 11, further comprising:
a receiver, wherein the receiver receives the additional damage accumulation information from a communication system incorporated into the particular autonomous vehicle, and wherein the communication system incorporated into the particular autonomous vehicle receives the additional damage accumulation information from the data logger.

18. The computing system of claim 14, wherein the one or more environmental conditions to which the electronic module has been exposed and that are monitored by the data logger comprise at least one of temperature, humidity, vibration, voltage, or current.

19. The computing system of claim 1, wherein the fleet-wide damage accumulation information for the type of the electronic module further comprises one or more of:
logged temperatures to which the electronic modules of the plurality of autonomous vehicles in the fleet have been exposed over time;
logged humidity levels to which the electronic modules of the plurality of autonomous vehicles in the fleet have been exposed over time;
logged voltages to which the electronic modules of the plurality of autonomous vehicles in the fleet have been exposed over time; or
logged currents to which the electronic modules of the plurality of autonomous vehicles in the fleet have been exposed over time.

20. The computing system of claim 14, wherein the fleet-wide damage accumulation information for the type of the electronic module further comprises one or more of:
logged temperatures to which the electronic modules of the plurality of autonomous vehicles in the fleet have been exposed over time;
logged humidity levels to which the electronic modules of the plurality of autonomous vehicles in the fleet have been exposed over time;

logged voltages to which the electronic modules of the plurality of autonomous vehicles in the fleet have been exposed over time; or logged currents to which the electronic modules of the plurality of autonomous vehicles in the fleet have been exposed over time.

\* \* \* \* \*